US010940847B2

(12) United States Patent
Kato et al.

(10) Patent No.: US 10,940,847 B2
(45) Date of Patent: Mar. 9, 2021

(54) BRAKE CONTROL DEVICE

(71) Applicants: ADVICS CO., LTD., Kariya (JP);
TOYOTA JIDOSHA KABUSHIKI KAISHA, Toyota (JP)

(72) Inventors: Osayoshi Kato, Nagoya (JP); Yoshio Masuda, Anjo (JP); Hiroyuki Kodama, Kariya (JP); Takayuki Yamamoto, Nagakute (JP); Yasuji Mizutani, Toyota (JP)

(73) Assignees: ADVICS CO., LTD., Kariya (JP);
TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 16/136,859

(22) Filed: Sep. 20, 2018

(65) Prior Publication Data

US 2019/0092303 A1    Mar. 28, 2019

(30) Foreign Application Priority Data

Sep. 25, 2017  (JP) .............................. JP2017-183498
Mar. 30, 2018  (JP) .............................. JP2018-069104

(51) Int. Cl.
*B60T 13/74*    (2006.01)
*B60T 8/1766*   (2006.01)
(Continued)

(52) U.S. Cl.
CPC .............. *B60T 13/745* (2013.01); *B60T 8/17* (2013.01); *B60T 8/1766* (2013.01); *B60T 8/267* (2013.01);
(Continued)

(58) Field of Classification Search
CPC .......... B60T 13/745; B60T 8/368; B60T 8/17; B60T 13/686; B60T 8/1766; B60T 8/267; B60T 2270/608
(Continued)

(56) References Cited

U.S. PATENT DOCUMENTS

2002/0011362 A1*  1/2002  Toda .......................... B60L 7/26
                                                          180/65.31
2008/0255744 A1   10/2008  Yasui et al.
(Continued)

FOREIGN PATENT DOCUMENTS

| CN | 101289084 A | 10/2008 |
| JP | 2009-227023 A | 10/2009 |
| JP | 2016-144952 A | 8/2016 |

OTHER PUBLICATIONS

Office Action (First Office Action) dated Aug. 26, 2020, by the State Intellectual Property Office of People's Republic of China in corresponding Chinese Patent Application No. 201811087835.X and and English Translation of the Office Action. (15 pages).

*Primary Examiner* — Pamela Rodriguez
(74) *Attorney, Agent, or Firm* — Buchanan Ingersoll & Rooney PC

(57) ABSTRACT

A brake control device adjusts a front wheel braking hydraulic pressure of front wheel cylinders provided on front wheels of a vehicle and a rear wheel braking hydraulic pressure of rear wheel cylinders provided on rear wheels of the vehicle. The brake control device includes a hydraulic pressure generating unit configured to adjust a hydraulic pressure generated by an electric motor to an adjusted hydraulic pressure and apply the adjusted hydraulic pressure as the rear wheel braking hydraulic pressure and a hydraulic pressure correcting unit configured to adjust to decrease the adjusted hydraulic pressure to be a corrected hydraulic (Continued)

pressure, and apply the corrected hydraulic pressure as the front wheel braking hydraulic pressure.

5 Claims, 7 Drawing Sheets

(51) Int. Cl.
    *B60T 8/26*     (2006.01)
    *B60T 8/17*     (2006.01)
    *B60T 8/36*     (2006.01)
    *B60T 13/68*     (2006.01)

(52) U.S. Cl.
    CPC ............ *B60T 8/368* (2013.01); *B60T 13/686* (2013.01); *B60T 2270/608* (2013.01)

(58) Field of Classification Search
    USPC ........................... 303/3, 10, 11, 157, 158, 20
    See application file for complete search history.

(56) References Cited

U.S. PATENT DOCUMENTS

| | | | |
|---|---|---|---|
| 2012/0299367 A1* | 11/2012 | Ross | B60T 8/4872 |
| | | | 303/3 |
| 2015/0123456 A1* | 5/2015 | Sato | B60L 1/003 |
| | | | 303/3 |
| 2017/0210363 A1* | 7/2017 | Klinger | B60T 8/26 |
| 2018/0037203 A1 | 2/2018 | Maruo et al. | |

\* cited by examiner

BRAKE CONTROL DEVICE

TECHNICAL FIELD

The present invention relates to a brake control device for a vehicle.

BACKGROUND ART

Examples of a brake device (braking device) mounted on a vehicle include a configuration including a master cylinder and an electric cylinder configured to be driven by an electric motor on an upstream side, and an actuator on a downstream side as described in JP-A-2009-227023. Examples also include a hydraulic pressure control device provided with a master cylinder on an upstream side and an actuator on a downstream side disclosed in JP-A-2016-144952.

CITED REFERENCE

Patent Document

[Patent Document 1] JP-A-2009-227023
[Patent Document 2] JP-A-2016-144952

SUMMARY OF INVENTION

Problem to be Solved by Invention

In the above-described brake device and the above-described hydraulic pressure control device, the pressures of front and rear wheels cannot be raised simultaneously and to different liquid pressures only by devices on the upstream side (in other words, without driving the actuator) because of the structure. In addition, in the above-descried hydraulic pressure control device, the pressures of the front and rear wheels may be increased alternately by opening and closing an electromagnetic valve by using an actuator. However, problems remains in terms of smooth pressure rising, operating noise of the actuator, and durability.

In contrast, the inventors thought that both of an improvement in fuel economy and an improvement in motion performance (vehicle stability) are desired specifically for a braking system for a vehicle configured to perform regenerative coordination control in the future. For example, in a hybrid vehicle configured to perform the regenerative coordination control, it seems to be preferable to use a regenerative braking force to the maximum and distribute a braking force to the front and rear wheels as close to an ideal distribution line as possible. The inventors also thought that it is preferable to reduce driving of the actuator on the downstream side in terms of durability, operating noises, and costs during normal braking except specific control such as ABS control (antiskid control). In other words, based on the idea described above, the inventers has set a new object to provide a brake control device capable of applying different hydraulic pressures simultaneously to front wheels and rear wheels by a pressurizing configuration of one system using an electric motor without performing hydraulic pressure distribution with the actuator on the downstream side.

Means for Solving the Problem

A brake control device of a first aspect of the present invention is a brake control device configured to adjust a front wheel braking hydraulic pressure of a front wheel cylinder provided on a front wheel of a vehicle and a rear wheel braking hydraulic pressure of a rear wheel cylinder provided on a rear wheel of the vehicle, the brake control device including: a hydraulic pressure generating unit configured to adjust a hydraulic pressure generated by an electric motor to be an adjusted hydraulic pressure, and apply the adjusted hydraulic pressure as the rear wheel braking hydraulic pressure; and a hydraulic pressure correcting unit configured to adjust to decrease the adjusted hydraulic pressure to be a corrected hydraulic pressure and apply the corrected hydraulic pressure as the front wheel braking hydraulic pressure.

A brake control device of a second aspect of the present invention is a brake control device configured to adjust a front wheel braking hydraulic pressure of a front wheel cylinder provided on a front wheel of a vehicle and a rear wheel braking hydraulic pressure of a rear wheel cylinder provided on a rear wheel of the vehicle, the brake control device including: a hydraulic pressure generating unit configured to adjust a hydraulic pressure generated by an electric motor to be an adjusted hydraulic pressure, and apply the adjusted hydraulic pressure as the front wheel braking hydraulic pressure; and a hydraulic pressure correcting unit configured to adjust to decrease the adjusted hydraulic pressure to be a corrected hydraulic pressure and apply the corrected hydraulic pressure as the rear wheel braking hydraulic pressure.

Advantageous Effects of Invention

According to the present invention, a hydraulic pressure is generated by using the electric motor, the hydraulic pressure generating unit applies an adjusted hydraulic pressure to the front wheel (rear wheel in the second aspect), the hydraulic pressure correcting unit applies a corrected hydraulic pressure lower than the adjusted hydraulic pressure to the rear wheel (front wheel in the second aspect). In other words, according to the present invention, different hydraulic pressures may be applied to the front wheel and the rear wheel simultaneously by the one-system pressurizing configuration using the electric motor.

DESCRIPTION OF EMBODIMENTS

Figure 1:
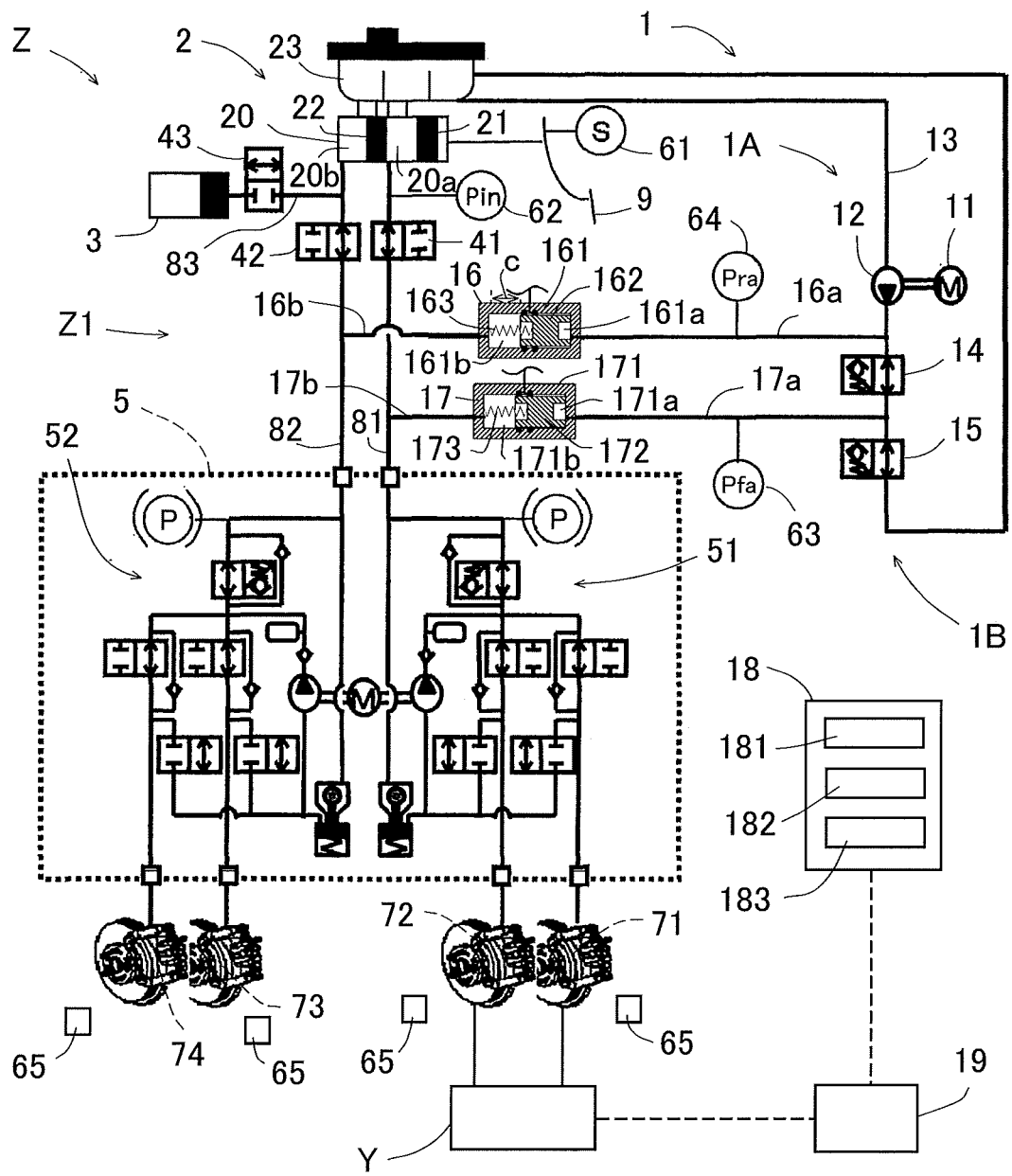
FIG. 1 is a configuration drawing of a brake control device according to a first embodiment.

Referring now to the drawings, embodiments of the present invention will be described. The drawings used in description are conceptual drawings and the shapes of the respective components may not necessarily be exact. In the embodiments, a brake control device applied to a hybrid vehicle will be described as an example.

First Embodiment

A brake control device 1 of a first embodiment is built in a vehicle braking device Z. The vehicle braking device Z includes the brake control device 1, a cylinder mechanism 2, a stroke simulator 3, electromagnetic valves 41, 42, 43, an actuator 5, a stroke sensor 61, pressure sensors 62 to 64, wheel cylinders 71, 72, 73, 74, and a regenerative braking mechanism Y as illustrated in FIG. 1. Components other than the brake control device 1 will now be briefly described.

The cylinder mechanism 2 includes a master cylinder 20, master pistons 21, 22, and a master reservoir 23. The master pistons 21, 22 are slidably disposed in the master cylinder 20. The master pistons 21, 22 move according to an operation of a brake pedal 9. The brake pedal 9 is an example of a brake operating member. The master pistons 21, 22 partition an interior of the master cylinder 20 into a first master chamber 20*a* and a second master chamber 20*b*. The master reservoir 23 is a reservoir tank (atmospheric pressure reservoir) having a flow passage (hydraulic passage) in communication with the first master chamber 20*a* and the second master chamber 20*b*. An interior of the master reservoir 23 is partitioned into three chambers by partitioning walls. The interior of the master reservoir 23 is divided into a chamber in communication with the first master chamber 20*a*, a chamber in communication with the second master chamber 20*b*, and a chamber connected to a return flow passage 13 of the brake control device 1, described later. The communication between the master reservoir 23 and the master chambers 20*a*, 20*b* is established/interrupted by the movement of the master pistons 21, 22. The first master chamber 20*a* is connected to the actuator 5 (a first conduit system 51 described later) via a flow passage 81 and the electromagnetic valve 41. The second master chamber 20*b* is connected to the actuator 5 (a second conduit system 52 described later) via a flow passage 82 and the electromagnetic valve 42.

The stroke simulator 3 is a device configured to generate a reaction force against the operation of the brake pedal 9, and includes a cylinder, a piston, and a spring. The stroke simulator 3 is connected to the second master chamber 20*b* via the flow passage 82, a flow passage 83 and the electromagnetic valve 43. The flow passage 83 is connected to the flow passage 82 at a portion between the second master chamber 20*b* and the electromagnetic valve 42.

The electromagnetic valves 41, 42 are so-called master cut valves, and are normally-opened electromagnetic valves. The electromagnetic valves 41, 42 are provided in the flow passages 81, 82 connecting the corresponding master chambers 20*a*, 20*b* and the actuator 5. The electromagnetic valve 43 is a so-called simulator cut valve, and is a normally-closed electromagnetic valve. The electromagnetic valve 43 is provided in the flow passage 83 connecting the flow passage 82 with the stroke simulator 3. When a braking operation starts, the electromagnetic valves 41, 42 are closed and the electromagnetic valve 43 is opened under control of a brake ECU 18 described later. In non-energized condition, the electromagnetic valves 41, 42 are opened and the electromagnetic valve 43 is closed. When any trouble in an electric system occurs, the above-described non-energized condition is effected, and thus the flow passage to the stroke simulator 3 is cut, the master chambers 20*a*, 20*b* and the wheel cylinders 71 to 74 communicate with each other, and hydraulic pressures in the wheel cylinders 71 to 74 increase by the braking operation of a driver.

The actuator 5 is a so-called pressure regulating device on the downstream side, and is a device for adjusting the hydraulic pressure of a brake fluid supplied from the device on the upstream side and supplying the brake fluid to the wheel cylinders 71 to 74. The actuator 5 includes a plurality of electromagnetic valves, an electric pump, and a reservoir. The actuator 5 may execute, for example, a pressure increasing control, a holding control, or a pressure decreasing control based on a command from the brake ECU 18 described later on the wheel cylinders 71 to 74. The actuator 5 includes the first conduit system 51 connected to the wheel cylinders 71, 72 for front wheels, and the second conduit system 52 connected to the wheel cylinders 73, 74 for rear wheels. In this embodiment, a front/rear conduit brake system is employed. The actuator 5 may execute specific control such as an ABS control (antiskid control) or a stability control. The actuator 5 may be operated corresponding to regenerative coordination control. Derailed description of the publicly known actuator 5 is omitted.

The stroke sensor 61 is a sensor configured to detect an amount of operation (stroke St) of the brake pedal 9. The pressure sensor 62 is a sensor configured to detect pressures in the master chambers 20*a*, 20*b* (master pressure Pin) and is connected to the flow passage 81 at a portion between the first master chamber 20*a* and the electromagnetic valve 41. The pressure sensor 63 is a sensor configured to detect a front wheel braking hydraulic pressure (front wheel detection value Pfa) supplied from the brake control device 1 to the first conduit system 51. The front wheel braking hydraulic pressure may be considered to be the hydraulic pressure of the front wheel cylinders 71, 72 provided on the front wheels of the vehicle with the actuator 5 not activated. The pressure sensor 64 is a sensor configured to detect a rear wheel braking hydraulic pressure (rear wheel detection value Pra) supplied from the brake control device 1 to the second conduit system 52. The rear wheel braking hydraulic pressure may be considered to be hydraulic pressure of the rear wheel cylinders 73, 74 provided on the rear wheels of the vehicle with the actuator 5 not activated. Hereinafter, a detection value of the pressure sensor 63 is referred to as the front wheel detection value Pfa, and a detection value of the pressure sensor 64 is referred to as the rear wheel detection value Pra.

The wheel cylinders 71 to 74 are members built in a friction brake device configured to apply a hydraulic pressure braking force to the wheels (hydraulic pressure braking force application member). The regenerative braking mechanism Y includes mainly a motor, an inverter, and a battery, not illustrated. The regenerative braking mechanism Y according to the first embodiment is disposed for the front wheels. In other words, the vehicle according to the first embodiment is a vehicle provided with a drive motor for the front wheels and thus a regenerative braking force is applied to the front wheels. Wheel velocity sensors 65 are provided on the respective wheels. The actuator 5 is controlled based on information on the wheel velocity sensors 65 by the brake ECU 18 described later and functions as an anti-lock brake system (ABS) and a stability control device.

The brake control device 1 according to the first embodiment will now be described. The brake control device 1 includes an electric motor 11, a pump 12, the return flow passage 13, a first differential pressure control valve 14, a second differential pressure control valve 15, a first separation cylinder 16, a second separation cylinder 17, the brake ECU 18, and a hybrid ECU 19. The electric motor 11 is connected to the pump 12, and is driven under control of the brake ECU 18. The electric motor 11 is provided with a sensor configured to detect the number of revolutions and the angle of rotation of the motor and the detection values (the number of revolutions Na and an angle of rotation Mk) are transmitted to the brake ECU 18. The number of revolutions Na of the motor can be computed by applying temporal differentiation to the angle of rotation Mk of the motor. The pump 12 is driven by a driving force of the electric motor 11. The return flow passage 13 is a flow passage connecting a discharge port and an intake port of the pump 12, and includes the master reservoir 23 in this embodiment.

The first differential pressure control valve 14 is an electromagnetic valve disposed in the return flow passage 13 and configured to be capable of controlling the return flow passage between a communicating condition and a differential pressure condition (throttling condition). One side connecting port of the first differential pressure control valve 14 is connected to the discharge port of the pump 12 via the return flow passage 13. The second differential pressure control valve 15 is an electromagnetic valve disposed in the return flow passage 13 and configured to be capable of controlling the return flow passage between the communicating condition and the differential pressure condition (throttling condition). The second differential pressure control valve 15 is an electromagnetic valve, connected at one side connecting port to the other side connecting port of the first differential pressure control valve 14 via the return flow passage 13, and connected at the other side connecting port to the inlet port of the pump 12 via the master reservoir 23.

The first separation cylinder 16 is a cylinder member whose an input port is connected to the return flow passage 13 via a flow passage 16a and whose an output port is connected to the flow passage 82 (the second conduit system 52) via a flow passage 16b. The input port of the first separation cylinder 16 is connected to the return flow passage 13 at a portion between the discharge port of the pump 12 and the first differential pressure control valve 14. The first separation cylinder 16 includes mainly a cylinder portion 161, a piston portion 162, and an elastic member 163. The cylinder portion 161 is a bottomed cylindrical member (cylinder-shaped member) including an input port on a bottom portion on one side and an output port provided on a bottom portion provided on the other side. The piston portion 162 is a column-shaped member and is slidably disposed in the cylinder portion 161. The elastic member 163 is a compression spring disposed in the cylinder portion 161, and biases the piston portion 162 toward the input port.

An end surface of the piston portion 162 is provided with a recess. The piston portion 162 partitions an interior of the cylinder portion 161 into an input chamber 161a on the input port side and an output chamber 161b on the output port side. When a brake fluid is supplied to the input chamber 161a, the piston portion 162 moves against a biasing force of the elastic member 163 within a predetermined movable range c. Once a brake fluid having a freely selected hydraulic pressure is supplied to the input chamber 161a via the flow passage 16a, the first separation cylinder 16 outputs the brake fluid from the output chamber 161b at the freely-selected hydraulic pressure (the same hydraulic pressure as the hydraulic pressure of input). Depending on the function, the input chamber 161a corresponds to a separation chamber and the output chamber 161b corresponds to a pressure chamber. Briefly, the first separation cylinder 16 includes the cylinder portion 161 and the piston portion 162, and includes the output chamber 161b connected to the wheel cylinders 73, 74 for the rear wheels and the input chamber 161a located on an opposite side from the output chamber 161b with respect to the piston portion 162. The pressure sensor 64 is connected to the flow passage 16a.

The second separation cylinder 17 is a cylinder member whose an input port is connected to the return flow passage 13 via a flow passage 17a and whose an output port is connected to the flow passage 81 (first conduit system 51) via a flow passage 17b. The input port of the second separation cylinder 17 is connected to the return flow passage 13 at a portion between the first differential pressure control valve 14 and the second differential pressure control valve 15 (where no pump 12 is provided). The second separation cylinder 17 mainly includes a cylinder portion 171, a piston portion 172, and an elastic member 173 in the same manner as the first separation cylinder 16. The piston portion 172 partitions an interior of the cylinder portion 171 into an input chamber 171a and an output chamber 171b. In the same manner as the first separation cylinder 16, the second separation cylinder 17 is configured to output the brake fluid at the same hydraulic pressure as the input hydraulic pressure. A movable range of the second separation cylinder 17 is the same as the movable range c of the first separation cylinder 16. The pressure sensor 63 is connected to the flow passage 17a. A port connected to the master reservoir 23 is formed on peripheral surfaces of the cylinder portions 161, 171. Since the second separation cylinder 17 has a similar configuration to the first separation cylinder 16, a description thereof will be omitted.

The brake ECU 18 is an electronic control unit provided with a CPU and a memory and controls the electromagnetic valves 41 to 43, the electric motor 11, the differential pressure control valves 14, 15, and the actuator 5 based on detected values of the sensors 61 to 65. Detail description will be given later. The hybrid ECU 19 is an electronic control unit provided with a CPU and a memory and controls the regenerative braking mechanism Y. The hybrid ECU 19 executes the regenerative coordination control in cooperation with the brake ECU 18. Various items of information (for example, information on target deceleration, information on actually generated regenerative braking force, etc.) are transmitted between the brake ECU 18 and the hybrid ECU 19 via a communication bus.

The brake ECU 18 includes a motor control unit 181 configured to control the electric motor 11, a first valve control unit 182 configured to control the first differential pressure control valve 14, and a second valve control unit 183 configured to control the second differential pressure control valve 15 regarding a control to each component of the brake control device 1. The motor control unit 181 controls the number of revolutions of the electric motor 11 based on the various items of information. The first valve control unit 182 switches the condition of the first differential pressure control valve 14 between a communicating condition (a condition having zero differential pressure in essence) and a differential pressure condition by a control current. If the condition of the first differential pressure control valve 14 is the differential pressure condition, the first valve control unit 182 controls the differential pressure (throttle) to be generated. When the first differential pressure control valve 14 is controlled to the differential pressure condition and the pump 12 is activated, the hydraulic pressure (hereinafter, referred to also as a first hydraulic pressure) on the discharge port side of the pump 12 of the first differential pressure control valve 14 becomes higher than the hydraulic pressure (hereinafter, referred to also as a second hydraulic pressure) on the second differential pressure control valve 15 side of the first differential pressure control valve 14 by a value corresponding to a commanded differential pressure.

The second valve control unit 183 switches the condition of the second differential pressure control valve 15 between the communicating condition and the differential pressure condition by a control current. If the condition of the second differential pressure control valve 15 is the differential pressure condition, the second valve control unit 183 controls the differential pressure to be generated. When the second differential pressure control valve 15 is controlled to the differential pressure condition and the pump 12 is activated, the second hydraulic pressure becomes higher than the hydraulic pressure (hereinafter, referred to also as a third hydraulic pressure) on the inlet port side of the pump 12 of the second differential pressure control valve 15 by a value corresponding to a commanded differential pressure. In other words, it is possible to generate a relatively high pressure first fluid pressure and a relatively low pressure second fluid pressure by controlling the first differential pressure control valve 14 and the second differential pressure control valve 15 in the differential pressure condition and driving the pump 12 (First hydraulic pressure>second hydraulic pressure>third hydraulic pressure=atmospheric pressure).

When the first differential pressure control valve 14 is controlled to be the differential pressure condition and the second differential pressure control valve 15 is controlled to be the communicating condition, the first hydraulic pressure becomes higher than the atmospheric pressure depending on an differential pressure command value, and the second hydraulic pressure and the third hydraulic pressure become equal to the atmospheric pressure which is a pressure of the master reservoir 23 (first hydraulic pressure>second hydraulic pressure=third hydraulic pressure=atmospheric pressure). In this manner, the second differential pressure control valve 15 may be considered to be a device for generating the second hydraulic pressure by adjusting to decrease the first hydraulic pressure generated by the first differential pressure control valve 14 and the pump 12 (electric motor 11). The first differential pressure control valve 14 may be considered to be an electromagnetic valve configured to adjust the first hydraulic pressure and the second differential pressure control valve 15 may be considered to be an electromagnetic valve configured to adjust the second hydraulic pressure. The first hydraulic pressure corresponds to the "adjusted hydraulic pressure" and the second hydraulic pressure corresponds to the "corrected hydraulic pressure". The third hydraulic pressure may be considered to be a reservoir hydraulic pressure. When the first differential pressure control valve 14 is controlled to be the communicating condition and the second differential pressure control valve 15 is controlled to be the differential pressure condition, the first hydraulic pressure and the second hydraulic pressure become higher than the atmospheric pressure depending on the differential pressure command value, the first hydraulic pressure becomes equal to the second hydraulic pressure, and the third hydraulic pressure becomes equal to the atmospheric pressure (first hydraulic pressure=second hydraulic pressure>third hydraulic pressure=atmospheric pressure).

The first hydraulic pressure, which is a hydraulic pressure on the high-pressure side, is supplied to the wheel cylinders 73, 74 for the rear wheels via the first separation cylinder 16 and the second conduit system 52. The second hydraulic pressure, which is a hydraulic pressure on a low pressure side, is supplied to the wheel cylinders 71, 72 for the front wheels via the second separation cylinder 17 and the first conduit system 51. The supply of the first hydraulic pressure and the supply of the second hydraulic pressure are performed simultaneously.

In this manner, the brake control device 1 may be considered to be provided with a hydraulic pressure generating unit 1A and a hydraulic pressure correcting unit 1B. The hydraulic pressure generating unit 1A is configured to adjust the hydraulic pressure generated by the electric motor 11 to obtain the first hydraulic pressure (adjusted hydraulic pressure) and apply the first hydraulic pressure as the rear wheel braking hydraulic pressure, and the hydraulic pressure correcting unit 1B is configured to adjust to decrease the first hydraulic pressure to obtain the second hydraulic pressure (corrected hydraulic pressure), and apply the second hydraulic pressure as the front wheel braking hydraulic pressure. In other words, the hydraulic pressure generating unit 1A includes the electric motor 11, the pump 12, the return flow passage 13, the first differential pressure control valve 14, the motor control unit 181, and the first valve control unit 182. On the other hand, the hydraulic pressure correcting unit 1B includes the second differential pressure control valve 15 and the second valve control unit 183. More specifically, the brake control device 1 includes an upstream-side pressurizing device Z1 provided with the hydraulic pressure generating unit 1A and the hydraulic pressure correcting unit 1B, and the actuator 5, that is, a downstream-side pressurizing device and capable of executing the ABS control based on the detected value of the wheel velocity sensors 65. The brake control device 1 is applied to a vehicle configured to execute the regenerative coordination control, and includes the upstream-side pressurizing device Z1 and the actuator 5, that is, the downstream-side pressurizing device. In other words, the brake control device 1 may be considered to include a low-pressure control mechanism mainly including the electric motor 11 and the second differential pressure control valve 15, a differential pressure control mechanism (high-pressure control mechanism) arranged in series with the low-pressure control mechanism and including the first differential pressure control valve 14, and a control unit (brake ECU 18) configured to control the low-pressure control mechanism and the differential pressure control mechanism. The brake ECU 18 may be considered to be a control unit configured to control at least the upstream-side pressurizing device Z1.

Figure 2:
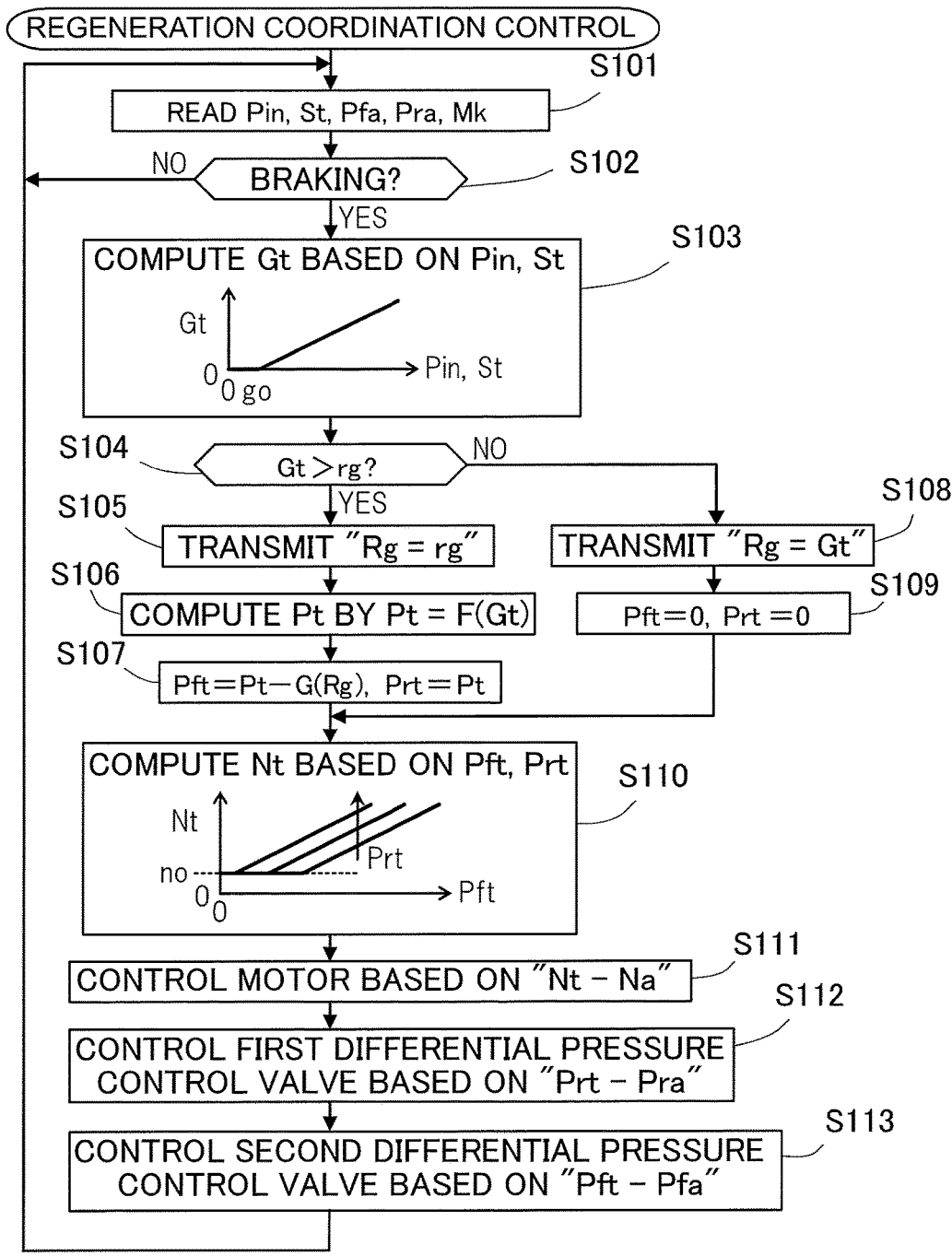
FIG. 2 is a flowchart illustrating a procedure of regenerative coordination control according to the first embodiment.

Referring now to FIG. 2, an example of the procedure of the regenerative coordination control performed by the brake ECU 18 and the hybrid ECU 19 will be described. The brake ECU 18 firstly reads the detection values of, for example, the sensors 61 to 64, specifically, the master pressure Pin, the stroke St, the front wheel detection value Pfa, the rear wheel detection value Pra, and the angle of rotation Mk (S101). The brake ECU 18 determines whether or not the present condition is "braking" based on these items of information (for example, the stroke St) (S102). When the present condition is "braking" (S102: Yes), the brake ECU 18 computes a target deceleration Gt based on at least one of the master pressure Pin and the stroke St (S103). The brake ECU 18 determines whether or not the target deceleration Gt is larger than a predetermined regeneration upper limit value (upper limit value of the regenerative braking force) rg (S104).

When the target deceleration Gt is larger than the regeneration upper limit value rg (S104: Yes), the brake ECU 18 transmits the regeneration upper limit value rg as a regeneration command value Rg, that is, the command value of the regenerative braking force to the hybrid ECU 19 (S105).

The brake ECU 18 then converts the target deceleration Gt to a hydraulic pressure (hydraulic pressure dimension) (F(Gt)) and calculates a required hydraulic pressure (in other words, a target wheel pressure) Pt (S106). Here, the function F(X) is a predetermined function for converting a target deceleration into a hydraulic pressure. The brake ECU 18 also converts the regeneration command value Rg into the hydraulic pressure to calculate a hydraulic pressure conversion value G(Rg), sets a value obtained by subtracting the hydraulic pressure conversion value G(Rg) from the required hydraulic pressure Pt as a front wheel target value Pft, that is, a required hydraulic pressure to the front wheels, and sets the required hydraulic pressure Pt as a rear wheel target value Prt, that is, a required hydraulic pressure to the rear wheels (S107). Here, a function G(x) is a predetermined function for converting the regeneration command value into a hydraulic pressure.

In contrast, when the target deceleration Gt is equal to or smaller than the regeneration upper limit value rg (S104: No), the brake ECU 18 transmits the target deceleration Gt to the hybrid ECU 19 as the regeneration command value Rg (Step S108). The brake ECU 18 sets the front wheel target value Pft and the rear wheel target value Prt to zero (S109).

The brake ECU 18 computes a target value Nt of the number of revolutions of the electric motor 11 based on the front wheel target value Pft and the rear wheel target value Prt (S110). The brake ECU 18 executes a number of revolutions feedback control for the electric motor 11 based on deviation between the target value Nt of the number of revolutions and a detected value (number of revolutions) Na (S111). The brake ECU 18 also executes a hydraulic pressure feedback control for the first differential pressure control valve 14 based on deviation between the rear wheel target value Prt of the hydraulic pressure and the rear wheel detection value Pra (S112). The brake ECU 18 also executes a hydraulic pressure feedback control for the second differential pressure control valve 15 based on deviation between the front wheel target value Pft of the hydraulic pressure and the front wheel detection value Pfa (S113).

Figure 3:
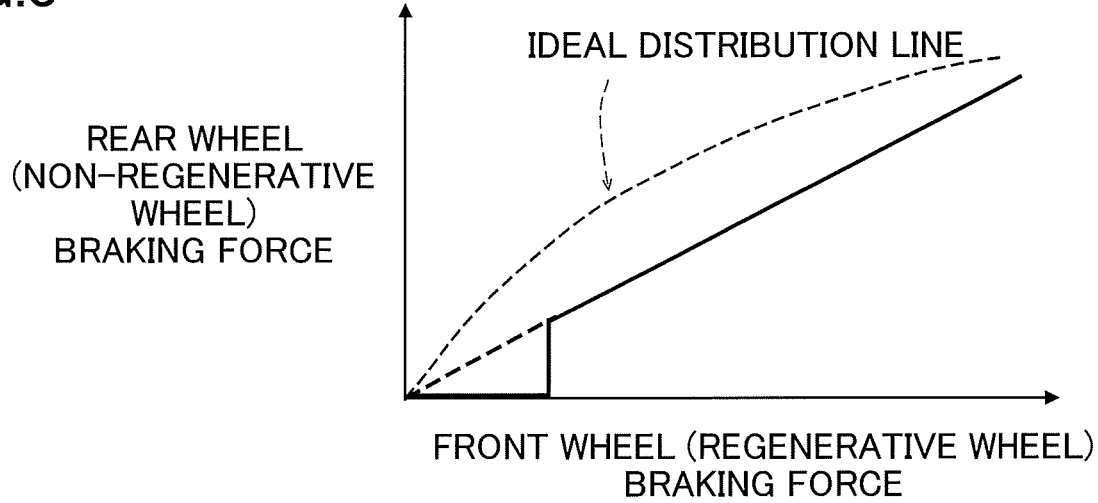
FIG. 3 is an explanatory drawing illustrating a braking force distribution and an ideal distribution line according to the first embodiment.

According to the brake control device 1 of the first embodiment, a freely selected performance may be set in a range, the first hydraulic pressure (rear wheel braking hydraulic pressure)≥the second hydraulic pressure (front wheel braking hydraulic pressure). For example, a relationship as illustrated in an example in FIG. 3 is applicable as the relationship between the braking force of the front wheels receiving the regenerative braking force and the braking force of the rear wheels receiving no regenerative braking force. In other words, the brake ECU 18 sets the front wheel target value Pft and the rear wheel target value Prt to zero until predetermined conditions are met (here, until the target deceleration Gt exceeds the regeneration upper limit value rg) and brakes the vehicle only by the regenerative braking force of the front wheels. When the predetermined conditions are met (when the target deceleration Gt exceeds the regeneration upper limit value rg), the brake ECU 18 controls the electric motor 11 and the first differential pressure control valve 14, and pressurizes the wheel cylinders 73, 74 of the rear wheels according to the target deceleration Gt without pressurizing the wheel cylinders 71, 72 of the front wheels and generates the hydraulic pressure braking force only on the rear wheels. In other words, the brake ECU 18 controls only the first differential pressure control valve 14 among the two differential pressure control valves 14, 15 into the differential pressure condition. In this condition, only the regenerative braking force acts on the front wheels, and only the hydraulic pressure braking force acts on the rear wheels.

Accordingly, only the braking force of the rear wheels increases (only the value of the vertical axis in FIG. 3 increases), and the braking force of the front and rear wheels can be brought close to an ideal distribution line. Since the braking force of the front and rear wheels can be brought close to an ideal distribution line efficiently by increasing only the value of the vertical axis in FIG. 3, a time during which a total braking force includes only the regenerative braking force of the front wheel (regenerating time) can be maximized compared with a case that only the value of the vertical axis in FIG. 3 is not increased (for example, when the ideal distribution line has an inclination). When the control is for increasing the hydraulic pressure braking forces of the front and rear wheels simultaneously from the condition of applying only the regenerative braking force, the hydraulic pressure braking force needs to be generated earlier before reaching the limit of the regenerating time for achieving distribution of the braking force close to the ideal distribution line. A control of generating only the hydraulic pressure braking force of the rear wheels can also be achieved, for example, by setting Pft to be maintained at zero until a predetermined condition (for example, such that the rear wheel detection value reaches a predetermined value) is satisfied in Step S107 in FIG. 2.

Subsequently, the brake ECU 18 performs the pressure increasing control also for the wheel cylinders 71, 72 of the front wheels based on a value obtained by subtracting the hydraulic pressure conversion value G(Rg) from the required hydraulic pressure Pt, and pressurizes simultaneously the front and rear wheels at different hydraulic pressures (the second hydraulic pressure for the front wheels and the first hydraulic pressure for the rear wheels). In other words, when the first differential pressure control valve 14 is in the differential pressure condition, the brake ECU 18 controls the second differential pressure control valve 15 to the differential pressure condition as well. In such conditions, the regenerative braking force and the hydraulic pressure braking force of the second hydraulic pressure are applied to the front wheels and the hydraulic pressure braking force of the first hydraulic pressure is applied to the rear wheels.

In this manner, according to the first embodiment, different hydraulic pressures can be simultaneously applied to the front and rear wheels by the one-system pressurizing device using the electric motor 11. In other words, in the braking device including the upstream-side pressurizing device Z1 and the downstream-side pressurizing device 5, different hydraulic pressure braking forces can be generated for the front and rear wheels only by the upstream-side pressurizing device Z1. Accordingly, at the time of normal braking without necessity of specific control such as the ABS control, two-channel (2 ch) control for the wheels is enabled only by the one-system pressurizing device on the upstream side, and the distribution of the braking force of the front and rear wheels close to the ideal distribution line is achieved while generation of the operating noise of the electromagnetic valve is reduced (without using the actuator 5). This configuration also leads to an improvement of durability of the actuator 5. According to this configuration, it is not necessary to provide two independent motors on the upstream side and the downstream side for the 2 ch control, and thus an increase in costs and physical size is prevented or reduced.

In addition, for example, when the brake control device 1 is applied to the hybrid vehicle, the 2 ch control (2 ch regeneration) may be executed only on the upstream side as described above, the performance of the regenerative braking force may be fully exerted without using the actuator 5, and the distribution of the braking force close to the ideal distribution line is achieved. Since the regenerative coordination control is always performed for the braking operation, the number of times of execution is much larger compared with the specific control such as the ABS control, and thus the execution of the 2 ch control by the actuator 5 generates a number of problems. However, according to the first embodiment, since the 2 ch control is enabled on the upstream side without using the actuator 5, prevention or reduction of generation of the operating noise, for example, by an operation of the actuator 5, an improvement of durability of the actuator 5, and a smooth pressure rising, are possible. In other words, according to this configuration, both of an improvement of fuel economy and an improvement of motion performance (vehicle stability) are enabled while occurrence of the problems that the operation on the downstream side may encounter is prevented or reduced.

According to this configuration, since the hydraulic pressure control uses the differential pressure control valves 14, 15, a smooth pressure rising and prevention and reduction of the operating noise can be achieved unlike control using an ON-OFF valve. In addition, since the interior of the master reservoir 23 is partitioned into a plurality of (three in this case) chambers, and the separation cylinders 16, 17 are provided, even when fluid leakage occurs in one of the first conduit system 51 and the second conduit system 52, servo control using the brake control device 1 can be continued for the other system. For example, when fluid leakage occurs in the second conduit system 52, the brake fluid in the chamber in communication with the second master chamber 20b in the master reservoir 23 is consumed. However, since the second conduit system 52 is fluidically separated from the first conduit system 51 and the return flow passage 13 of the brake control device 1 by the partitioning walls in the master reservoir 23 and the first separation cylinder 16, a consumption of the brake fluid in other chambers in the master reservoir 23 is prevented or reduced. A movement of the piston portions 162, 172 of the separation cylinders 16, 17 is limited within the predetermined movable range c, and the brake fluid does not move between the hydraulic pressure generating unit 1A and the hydraulic pressure correcting unit 1B, and the wheel cylinders 71 to 74. In other words, the amount of loss of the brake fluid caused by defects in one of the conduit systems is limited by a "fluidical separation" in which the pressure is transmitted, but the movement of the brake fluid does not occur. Reliability of the brake control device 1 is further improved by the separation cylinders 16, 17.

In the first embodiment, when the electric motor 11 is driven, a slight orifice effect may be produced even when the differential pressure control valves 14, 15 are in communicating condition, and hence a differential pressure may be generated between the input port and the output port. The separation cylinders 16, 17 are configured to generate an activation pressure (starting pressures of the piston portions 162, 172) larger than the differential pressure. Accordingly, when the commanded differential pressure applied to the differential pressure control valves 14, 15 is zero (that is, in the communicating condition), the separation cylinders 16, 17 do not operate even by the hydraulic pressure generated in the orifices of the differential pressure control valves 14, 15, and application of the hydraulic pressure to the wheel cylinders 71 to 74 is prevented.

Second Embodiment

A brake control device 10 according to a second embodiment is different from the first embodiment in the configuration of the hydraulic pressure generating unit. Therefore, only the different part will be described. In the description of the second embodiment, description and drawings of the first embodiment may be referenced as needed.

Figure 4:
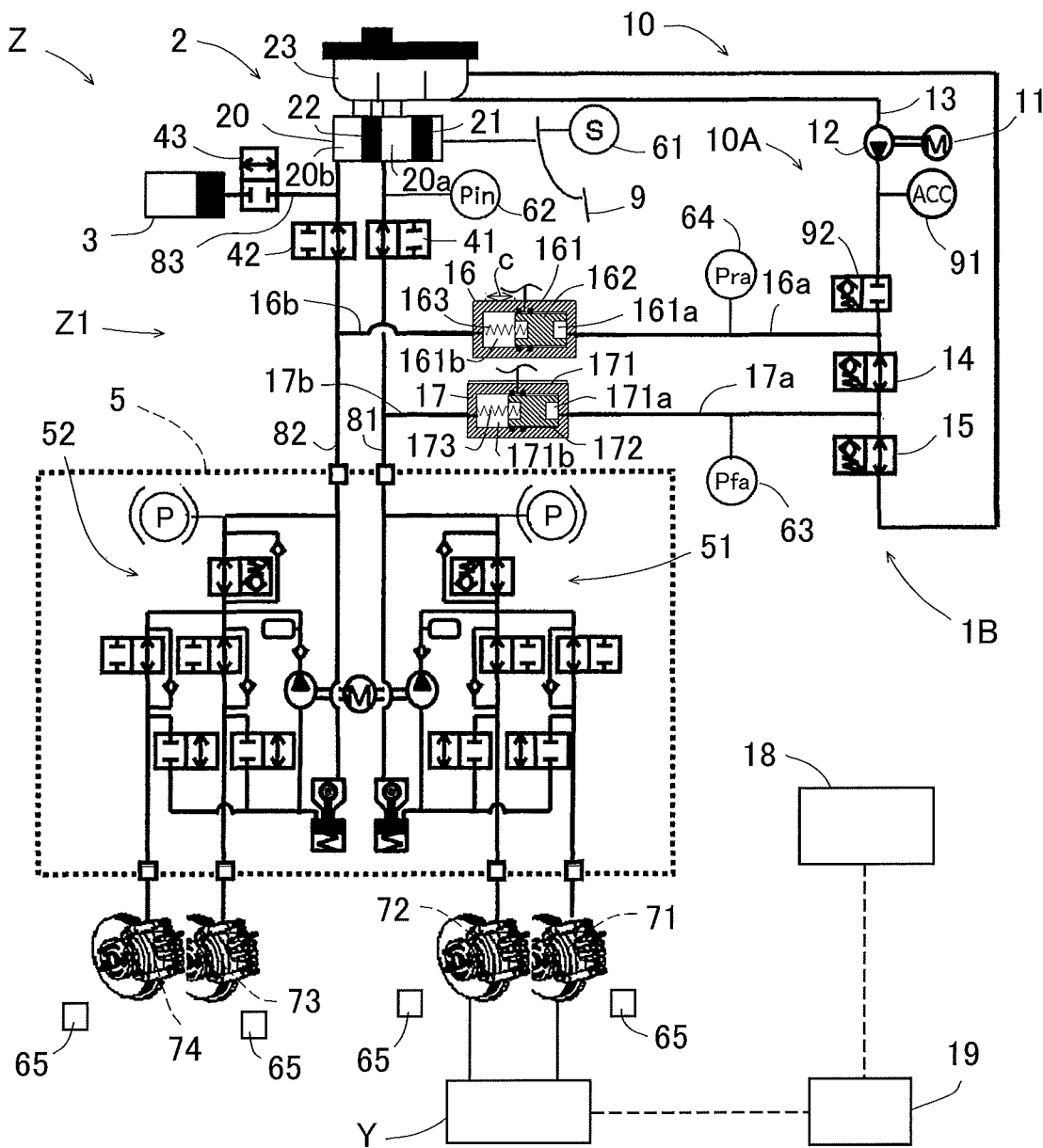
FIG. 4 is a configuration drawing of a brake control device according to a second embodiment.

As illustrated in FIG. 4, a hydraulic pressure generating unit 10A according to the second embodiment includes an accumulator 91 and an electromagnetic valve 92 in addition to the configuration of the hydraulic pressure generating unit 1A according to the first embodiment. The accumulator 91 is a pressure accumulating device (high-pressure source) and is connected to the return flow passage 13 between the discharge port of the pump 12 and the electromagnetic valve 92. The accumulator 91 accumulates a brake fluid at a predetermined pressure (high pressure) by driving of the pump 12. The electromagnetic valve 92 is a normally closed electromagnetic valve provided between the discharge port of the pump 12 and a connecting portion between the flow passage 16a and the return flow passage 13. In other words, the electromagnetic valve 92 is a normally closed valve which is connected at a connecting port on one side to the discharge port of the pump 12 and which is connected at a connecting port on the other side to the flow passage 16a and the first differential pressure control valve 14. As used herein the electromagnetic valve 92 adopts an electromagnetic valve capable of controlling the flow rate. However, the ON-OFF valve (binary control valve) may also be adopted.

According to the second embodiment, after the electric motor 11 and the pump 12 are driven and a predetermined pressure is accumulated in the accumulator 91, the electromagnetic valve 92 is opened and the differential pressure control valves 14, 15 are controlled to the differential pressure condition, and thus the wheel cylinders 71 to 74 are pressurized. In other words, during the pressure increasing control, the brake ECU 18 drives the electric motor 11 with the electromagnetic valve 92 kept in the closed state to accumulate the pressure in the accumulator 91, then brings the electromagnetic valve 92 into the opened state, and controls the first differential pressure control valve 14 and the second differential pressure control valve 15 to the differential pressure condition in the same manner as the first embodiment. The brake ECU 18 may be considered to include a valve control unit configured to function to control opening and closing (flow rate) of the electromagnetic valve 92. In this configuration as well, the different hydraulic pressures (differential pressure) are generated between the predetermined flow passages, the brake fluid having a relatively high pressure may be supplied to the wheel cylinders 73, 74 of the rear wheels, and the brake fluid having a relatively low pressure may be supplied to the wheel cylinders 71, 72 of the front wheels in the same manner as in the first embodiment. According to the second embodiment as well, the effects as the first embodiment are achieved. In terms of the number of components, the first embodiment is advantageous. In contrast, in terms of a pressurization response speed, the second embodiment is advantageous.

Third Embodiment

A brake control device 100 according to a third embodiment is different from the first embodiment in the configuration of the hydraulic pressure generating unit and the hydraulic pressure correcting unit. Therefore, only the different part will be described. In the description of the third embodiment, descriptions and the drawings of the first and the second embodiments may be referenced as needed.

Figure 5:
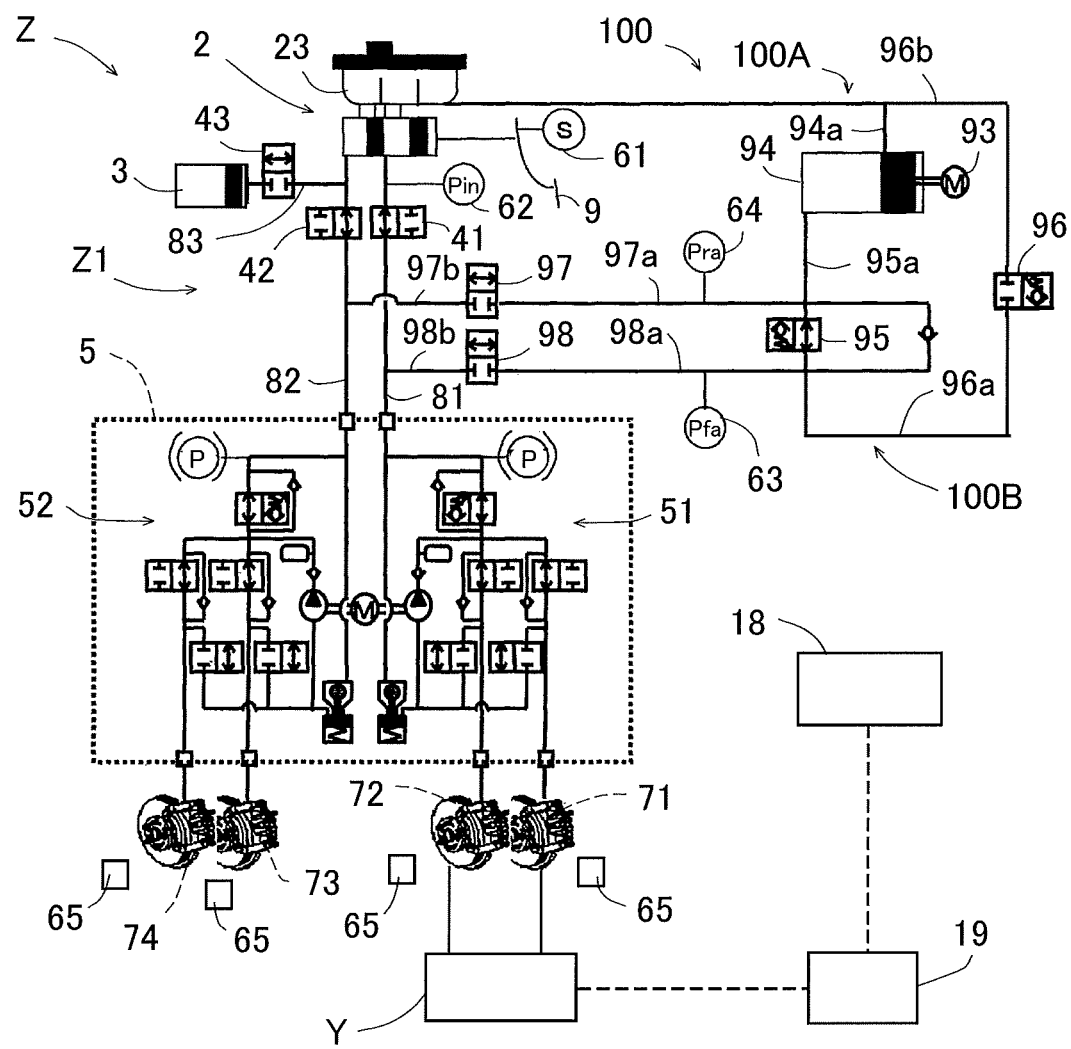
FIG. 5 is a configuration drawing of a brake control device according to a third embodiment.

As illustrated in FIG. 5, the brake control device 100 includes an electric motor 93, an electric cylinder 94, electromagnetic valves 95, 96, cut valves 97, 98, the brake ECU 18 configured to control these devices, and the hybrid ECU 19. The electric motor 93 is driven under control of the brake ECU 18 and transmits a drive force to the electric cylinder 94 in the same manner as the electric motor 11 of the first embodiment. The electric cylinder 94 is a mechanism including a cylinder and a piston, and is configured to move the piston by driving of the electric motor 93, and outputs the brake fluid in the cylinder from an output port by advancement of the piston. When the piston is at an initial position, the electric cylinder 94 brings the master reservoir 23 and an interior of the cylinder into communication via a flow passage 94a, and when the piston advances by a predetermined amount, the electric cylinder 94 interrupts the flow passage 94a.

The electromagnetic valve 95 is a normally opened electromagnetic valve which is connected at a connecting port on one side to an output port of the electric cylinder 94 and the cut valve 97 and which is connected at a connecting port on the other side to the electromagnetic valve 96 and the cut valve 98. The electromagnetic valve 95 includes a check valve. A flow passage 95a is a flow passage connecting the connecting port on one side of the electromagnetic valve 95 and the output port of the electric cylinder 94. A flow passage 97a is a flow passage connecting a connecting port on one side of the cut valve 97 and the flow passage 95a. A flow passage 96a is a flow passage connecting the connecting port on the other side of the electromagnetic valve 95 and a connecting port on one side of the electromagnetic valve 96. A flow passage 96b is a flow passage connecting a connecting port on the other side of the electromagnetic valve 96 and the flow passage 94a. The electromagnetic valve 96 is a normally closed electromagnetic valve. The electromagnetic valves 95, 96 are electromagnetic valves capable of adjusting the flow rate.

The cut valve 97 is a normally closed electromagnetic valve whose one side connecting port is connected to the flow passage 95a via the flow passage 97a, and whose the other side connecting port is connected to the second conduit system 52 via a flow passage 97b. The cut valve 98 is a normally-closed electromagnetic valve whose one side connecting port is connected to the flow passage 96a via a flow passage 98a and whose the other side connecting port is connected to the first conduit system 51 via a flow passage 98b. The cut valves 97, 98 are ON-OFF valves (binary control valves). The flow passages 94a, 95a, 96a, 96b constitute a return flow passage (corresponding to the return flow passage 13).

When a relatively high pressure is applied to the rear wheels and a relatively low pressure is applied to the front wheels, the brake ECU 18 brings the electromagnetic valve 95 in the flow rate controlled condition (in communication), brings the electromagnetic valve 96 in the closed state (depressurization adjustment by opening the valve as needed), and drives the electric cylinder 94 by the electric motor 93 to generate a hydraulic pressure. The brake ECU 18 then opens the cut valves 97, 98 and supplies a brake fluid to the wheel cylinders 71 to 74. When the front wheels side are pressurized (front wheels side≤rear wheels side), for example, a high pressure brake fluid flows toward the front wheels side by bringing the electromagnetic valve 95 into the opened state (by adjusting the flow rate) as needed. For the pressure decreasing control, the brake ECU 18 executes opening of the electromagnetic valve 96 and/or drive control of the electric motor 93 (angle of rotation or direction of rotation). In this manner, according to the third embodiment as well, the 2 ch control is enabled only on the upstream side.

In the third embodiment, a hydraulic pressure generating unit 100A is considered to include the electric motor 93, the electric cylinder 94, the electromagnetic valve 95 and/or the electromagnetic valve 96, and the brake ECU 18 (part of functions). A hydraulic pressure correcting unit 100b may be considered to include the electromagnetic valves 95, 96 and the brake ECU 18 (part of functions).

Fourth Embodiment

The brake control device 1 of the fourth embodiment is different from the first embodiment in a destination of connection of the wheel cylinders 71 to 74 and setting of the first separation cylinder 16. Therefore, only the different part will be described. In the description of the fourth embodiment, description and drawings of the first embodiment may be referenced as needed.

Figure 6:
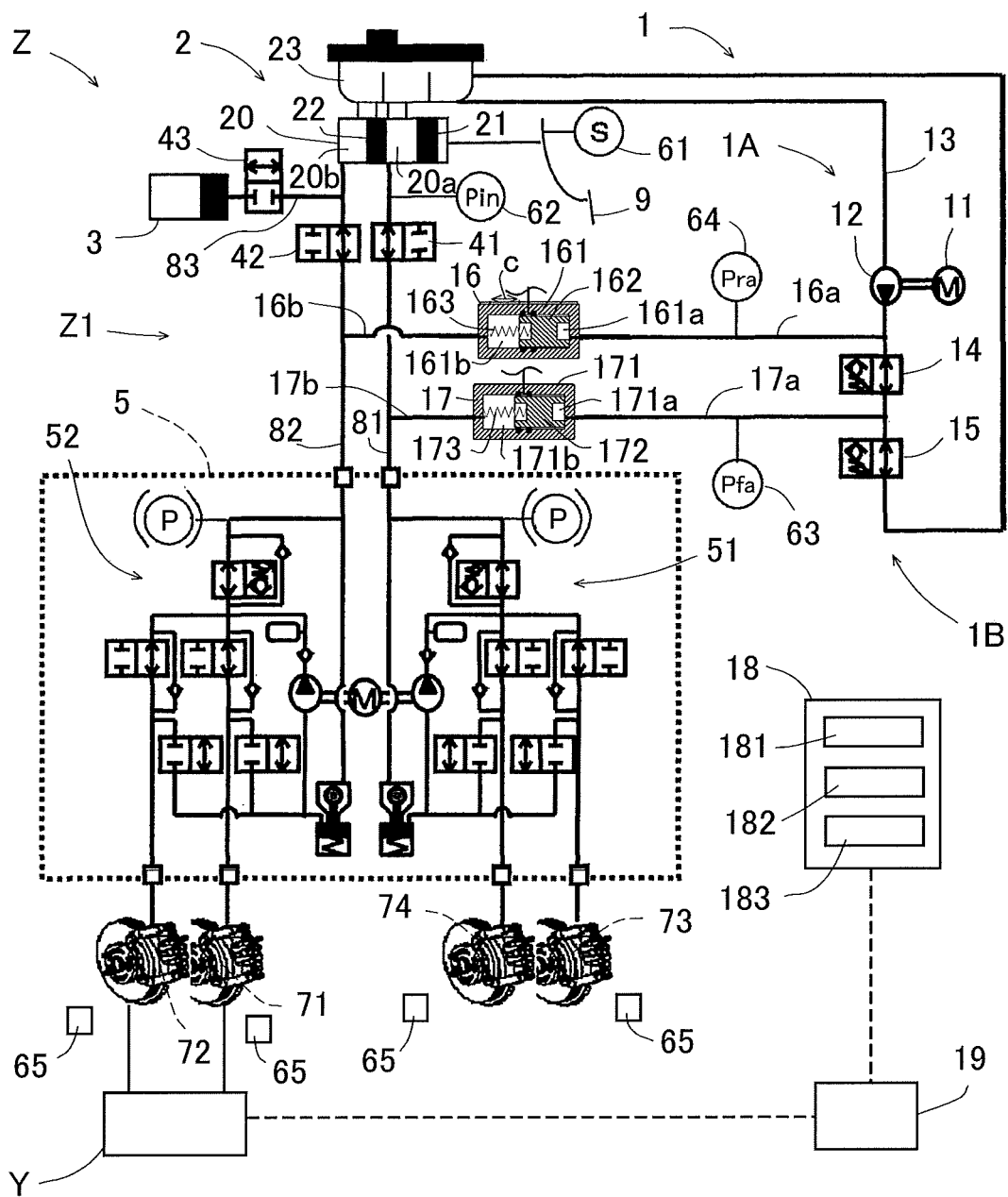
FIG. 6 is a configuration drawing of a brake control device according to a fourth embodiment.

As illustrated in FIG. 6, in the fourth embodiment, the wheel cylinders 71, 72 of the front wheels are connected to the first separation cylinder (corresponding to the "first cylinder device") 16 via the second conduit system 52, and the wheel cylinders 73, 74 of the rear wheels are connected to the second separation cylinder (corresponding to the "second cylinder device") 17 via the first conduit system 51. In other words, in the fourth embodiment, the wheel cylinders 71 to 74 are replaced between the front wheels and the rear wheels from the configuration of the first embodiment. In other words, the first hydraulic pressure outputted from the first separation cylinder 16 is supplied to the wheel cylinders 71, 72 of the front wheels. The second hydraulic pressure outputted from the second separation cylinder 17 is supplied to the wheel cylinders 73, 74 of the rear wheels. The regenerative braking mechanism Y is provided on the front wheels in the same manner as in the first embodiment.

A predetermined set load is set to the first separation cylinder 16. As described above, the first separation cylinder 16 includes the cylinder portion 161, the piston portion 162 slidable in the cylinder portion 161, and the elastic member 163 configured to bias the piston portion 162 in the cylinder portion 161 in a predetermined direction (toward the return flow passage 13 side, that is, toward the input chamber 161a side). The second separation cylinder 17 also includes the cylinder portion 171, the piston portion 172 slidable in the cylinder portion 171, and the elastic member 173 configured to bias the piston portion 172 in a predetermined direction (toward the return flow passage 13 side, that is, toward the input chamber 171a side) in the cylinder portion 171. The hydraulic pressure generating unit 1A applies the first hydraulic pressure to the first separation cylinder 16 (the input chamber 161a), and the first separation cylinder 16 outputs the front wheel braking hydraulic pressure toward the wheel cylinders 71, 72 of the front wheels according to the sliding movement of the piston portion 162 by the first hydraulic pressure. The hydraulic pressure correcting unit 1B applies the second hydraulic pressure to the second separation cylinder 17 (input chamber 171a) and the second separation cylinder 17 outputs the rear wheel braking hydraulic pressure toward the wheel cylinders 73, 74 of the rear wheels according to the sliding movement of the piston portion 172 by the second hydraulic pressure.

In the fourth embodiment, a force required for the piston portion 162 of the first separation cylinder 16 to slide in the cylinder portion 161 is larger than a force required for the piston portion 172 of the second separation cylinder 17 to slide in the cylinder portion 171. More specifically, a set load of the elastic member 163 of the first separation cylinder 16 (hereinafter, referred to as "first set load") is larger than a set load of the elastic member 173 of the second separation cylinder 17 (hereinafter, referred to as "second set load). The first and second set loads are starting loads of the piston portions 162, 172, and may be set by, for example, spring constants and/or an initial compression length of the elastic members 163, 173. In this manner, the first separation cylinder 16 is configured to have the first set load larger than the second set load.

According to the fourth embodiment, the hydraulic pressure on the pump 12 side with respect to the first differential pressure control valve 14, that is, the first hydraulic pressure generating on the side closer to the pump 12 is supplied to the wheel cylinders 71, 72 of the front wheels via the first separation cylinder 16, and thus a pressure rising velocity of the front wheel braking hydraulic pressure may be increased. Accordingly, an improvement of response of the braking force of the front wheels contributing significantly to the deceleration is achieved and an improvement of response to a sudden braking is also achieved. In the configuration of the fourth embodiment, since the hydraulic pressure braking force of the front wheels is liable to be higher than the hydraulic pressure braking force of the rear wheels, excessive hydraulic pressure braking force of the rear wheels is suppressed or reduced, and vehicle stability is also improved.

Figure 7:
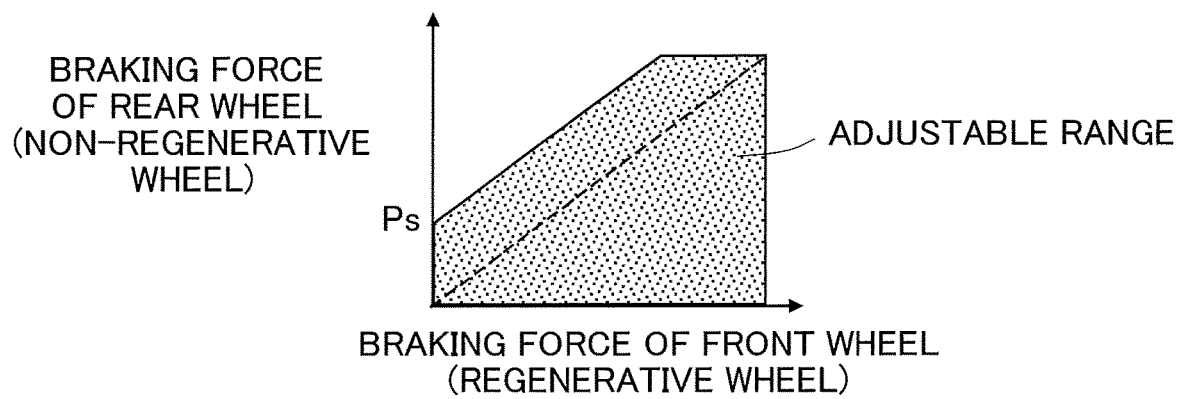
FIG. 7 is an explanatory drawing illustrating an adjustable range of a braking force by an upstream side pressure device according to the fourth embodiment.

According to the fourth embodiment, the hydraulic pressure braking force can be generated only on the front wheels by closing the first differential pressure control valve 14. Further, according to the fourth embodiment, it is also possible to make only the second separation cylinder 17 function and pressurize only the rear wheel cylinders 73, 74 by controlling the first differential pressure control valve 14 and the second differential pressure control valve 15 to make the first hydraulic pressure to be smaller than the first set load by setting the first set load to the first separation cylinder 16. In other words, a pressure adjustable range as illustrated in FIG. 7 is formed and pressure adjustment control to bring the braking force close to the ideal distribution line is also enabled. The first set load in FIG. 7 is expressed by an activation pressure Ps. The first set load is set to prevent the piston portion 162 from sliding until the predetermined first hydraulic pressure (the activation pressure Ps here) is generated by energization of the differential pressure control valve 14. The first set load is set considering the balance between the response of the hydraulic pressure braking force of the front wheels and the pressure adjustable range of the hydraulic pressure braking force of the rear wheels.

According to the fourth embodiment, since the pressure rising velocity of the wheel cylinders 71, 72 of the front wheels may be increased, an increase in size of the first differential pressure control valve 14 (flow passage) for increasing the pressure rising velocity is not necessary, and thus reduction of size and energy consumption is enabled. According to the fourth embodiment, the hydraulic pressure braking force may be applied only to the rear wheels, and thus application to the vehicle provided with the regenerative braking mechanism Y on the rear wheels is also effective. In other words, according to the configuration of the fourth embodiment, the regenerative braking mechanism Y functions effectively irrespective of whether it is mounted on the front wheels or on the rear wheels. According to the fourth embodiment, since the hydraulic pressure braking force is applied only to the front wheels, a control such as traction control can be achieved only by the brake control device 1 without operating the actuator 5, and it is advantageous in terms of prevention or reduction of operating noise.

The configuration of the fourth embodiment may be applied to the configuration of the second embodiment. In other words, as illustrated in FIG. 4, the wheel cylinders 73, 74 of the second embodiment may be connected to the front wheels and the wheel cylinders 71, 72 are connected to the rear wheels, and the first set load (first set load>second set load) may be set to the first separation cylinder 16. In this configuration, the similar effects as described above are achieved.

[Others]

The present invention is not limited to the above-described embodiments. For example, the separation cylinders 16, 17 in the brake control device 1, 10 of the first and second embodiments may be replaced by an electromagnetic valve (cut valve) in the same manner as the third embodiment. The actuator 5 may be omitted. The type of each of the valves used in the above-described embodiment may be of a type other than those described above. The brake ECU 18 may be composed of two ECUs. In this case, such configurations are applicable in which the electric motor 11 is controllable from both of the ECUs by a double winding, for example, the first differential pressure control valve 14 is controlled by one of the ECUs, and the second differential pressure control valve 15 is controlled by the other ECU. Accordingly, even when one of the ECUs fails, the normal ECU may control the electric motor 11 and the first differential pressure control valve 14 or the second differential pressure control valve 15, and hence the hydraulic pressure braking force may be generated for at least two wheels. In addition, the first differential pressure control valve 14 may be configured to be controllable by both of the ECUs by using, for example, a double winding, and the second differential pressure control valve 15 may be configured to be controllable by both of the ECUs.

When the predetermined conditions are met (for example, after an ignition is turned off when the vehicle is stopped and no brake operation is performed), the functional check of the control mechanism may be performed by, for example, the brake ECU 18. The brake ECU 18 operates, for example only the electric motor 11 and the first differential pressure control valve 14 for inspection, and determines whether or not the target value (differential pressure command value) coincides with the detected value (actual value) of the pressure sensor 64. If the target value coincides with the detected value of the pressure sensor 64, the brake ECU 18 determines these components are normal. When the first differential pressure control valve 14 is normal, The brake ECU 18 operates only the electric motor 11 and the second differential pressure control valve 15, and determines whether or not the target value (differential pressure command value) coincides with the detected value (actual value) of the pressure sensor 63. If the target value coincides with the detected value of the pressure sensor 63, the brake ECU 18 determines that these components are normal, and when both of the above-mentioned normality judgments are established, the brake ECU 18 determines that the control mechanism is normal.

In the first to third embodiments, the brake control device 1, 10, 100 may be configured to exchange the front and rear wheels (exchange the destinations of connection of the wheel cylinders) and supply the relatively high first hydraulic pressure to the wheel cylinders of the front wheels, and supply the relatively low second hydraulic pressure to the wheel cylinders of the rear wheels. This enables application of a high hydraulic pressure braking force to the front wheels, and hence is effective for the vehicle provided with the regenerative braking mechanism Y on the rear wheels. In other words, the brake control device 1, 10, 100 may be provided with a hydraulic pressure generating unit configured to adjust the hydraulic pressure generated by the electric motor 11 to obtain the first hydraulic pressure (adjusted hydraulic pressure) and apply the first hydraulic pressure as the front wheel braking hydraulic pressure, and a hydraulic pressure correcting unit configured to adjust to decrease the first hydraulic pressure to obtain (be) the second hydraulic pressure (corrected hydraulic pressure), and apply the second hydraulic pressure as the rear wheel braking hydraulic pressure. Briefly, assuming that the wheels, one of the front wheels and the rear wheels, provided with the drive (regenerative) motor are regenerating wheels, the wheels, the other one of the front wheels and the rear wheels, not provided with the drive (regenerative) motor are no-regenerating wheels, the brake control device 1, 10, 100 may be considered to be a brake control device configured to adjust the motor-side braking hydraulic pressure of the wheel cylinders provided on the generative wheels and the non-motor-side braking hydraulic pressure of the wheel cylinders provided on the non-regenerative wheels, and including the hydraulic pressure generating unit and the hydraulic pressure correcting unit. The hydraulic pressure generating unit is configured to adjust the hydraulic pressure generated by the electric motor 11 to obtain the first hydraulic pressure (adjusted hydraulic pressure) and apply the first hydraulic pressure as the non-motor-side braking hydraulic pressure, and the hydraulic pressure correcting unit is configured to adjust to decrease the first hydraulic pressure to obtain (be) the second hydraulic pressure (corrected hydraulic pressure) and apply the second hydraulic pressure as the motor-side braking hydraulic pressure.

From the view point of the regenerative coordination control, this embodiment will be described. The brake control device 1, 10, 100 may be considered to be a device configured to set the target hydraulic pressures for the front wheels and the rear wheels based on the target deceleration and the actually generated regenerative braking force, and control the pressurizing mechanism on the upstream side (electric motor, electromagnetic valve, etc.) to conform the actual hydraulic pressures to the corresponding target hydraulic pressure. Therefore, in this case, the actuator 5 may be considered to be provided for executing specifically the ABS control and the stability control. The hydraulic pressure correcting unit 1B may be considered to be configured to selectively execute decrease adjustment and pressure equqlization for the first hydraulic pressure to generate the second hydraulic pressure in cooperation with the hydraulic pressure generating unit 1A.

In the configurations of the first embodiment and the second embodiment, a force required for the piston portion 162 of the first separation cylinder 16 to slide in the cylinder portion 161 may be larger than a force required for the piston portion 172 of the second separation cylinder 17 to slide in the cylinder portion 171 as in the fourth embodiment. For example, in the first embodiment and the second embodiment, the first set load (first set load>second set load) may be set to the first separation cylinder 16. In other words, the first embodiment and the second embodiment may employ the configuration having the front wheels and the rear wheels exchanged from the configuration in the fourth embodiment. In this configuration, only the hydraulic pressure braking force of the front wheels may be increased by performing control taking the first set load into account (first hydraulic pressure<first set load) in the first embodiment and the second embodiment, and the adjustable range of the fore-and-aft braking force by the upstream-side pressurizing device Z1 may be widened (see FIG. 7). In this manner, the first separation cylinder 16 applies the first hydraulic pressure as one of the front wheel braking hydraulic pressure and the rear wheel braking hydraulic pressure depending on the sliding movement of the piston portion 162, and the second separation cylinder 17 applies the second hydraulic pressure as the other one of the front wheel braking hydraulic pressure and the rear wheel braking hydraulic pressure depending on the sliding movement of the piston portion 172. Note that the separation cylinders 16, 17 may be configured to bias the piston portions 162, 172, respectively, by a member other than the compression spring.

In the embodiment provided with the first separation cylinder 16 and the second separation cylinder 17, the brake control device may be configured to be provided with only one of the first separation cylinder 16 and the second separation cylinder 17. For example, in the configuration of the fourth embodiment, a configuration including only the first separation cylinder 16 and eliminating the second separation cylinder 17 is also applicable.

The force required for the piston portion 162 to slide in the cylinder portion 161 and the force required for the piston portion 172 to slide in the cylinder portion 171 may be set respectively by members other than the elastic members 163, 173. For example, the first separation cylinder 16 may be provided with a first sealing member, which is an elastic member. The first sealing member is a member provided on an inner surface of the cylinder portion 161, and is a member coming into contact with the piston portion 162 when the piston portion 162 moves within the predetermined movable range c. The force required for the piston portion 162 to slide in the cylinder portion 161 may be set depending on the material characteristics or the shape of the first sealing member. The force required for the piston portion 162 to slide in the cylinder portion 161 may be set depending on the combination between the first sealing member and the elastic member 163. A single or a plurality of first sealing member(s) may be provided. The second separation cylinder 17 may be provided with a second sealing member. The second sealing member may be the same sealing member as or different from the first sealing member.

The brake control device 1, 10 may be built in a vehicle braking device having a different configuration from the vehicle braking device Z disclosed in the above-described embodiment. For example, the brake control device may be built in a vehicle braking device not provided with the electromagnetic valves 41, 42, 43. In this case, the vehicle braking device includes, for example, a cylinder mechanism, the stroke simulator 3, and the actuator 5. The cylinder mechanism is provided with a master cylinder including a master piston provided slidably in the interior. The master cylinder includes a servo chamber and a master chamber. A hydraulic pressure (servo pressure) for causing the master piston to slide is supplied to the servo chamber. The master chamber outputs the hydraulic pressure (master pressure) to the actuator 5 according to driving of the master piston. The stroke simulator 3 is configured to generate a reaction force according to the amount of brake operation. In this case, the brake control device 1, 10 supplies one of the first hydraulic pressure and the second hydraulic pressure to the servo chamber, and the other one of the first hydraulic pressure and the second hydraulic pressure is supplied to the actuator 5. In this case as well, the brake control device 1, 10 may apply the first hydraulic pressure and the second hydraulic pressure, and thus is capable of applying different hydraulic pressures respectively to the front wheels and the rear wheels. In this case, note that the brake control device 1, 10 may be provided with both of the first separation cylinder 16 and the second separation cylinder 17, or only one of the first separation cylinder 16 and the second separation cylinder 17. When the brake control device 1, 10 includes only one of the first separation cylinder 16 and the second separation cylinder 17, the separation cylinder may be provided on a flow passage connected to the master cylinder, or may be provided in the flow passage connected to the actuator 5.

In addition, in this case, the brake control device 1, 10 may not be provided with the first separation cylinder 16 and the second separation cylinder 17. For example, a flow passage for supplying the first hydraulic pressure may be connected to the servo chamber, and a flow passage for supplying the second hydraulic pressure may be connected to the actuator 5. In other words, the first hydraulic pressure, which is a hydraulic pressure on the pump 12 side with respect to the first differential pressure control valve 14, is supplied to the master cylinder, and the second hydraulic pressure, which is a hydraulic pressure between the first differential pressure control valve 14 and the second differential pressure control valve 15 is supplied to the actuator 5. In this case, the first hydraulic pressure is used as a force for causing the master piston of the master cylinder to slide, and the second hydraulic pressure is directly supplied to the actuator 5. The force of the master piston for sliding in the master cylinder may be set depending on a set load of a biasing member configured to bias the master piston to a predetermined position. Slidability of the master piston is set depending on the set load of the biasing member. Therefore, the first hydraulic pressure adjusted by the master cylinder is supplied to the wheel cylinders 71, 72 of the front wheels. A single or a plurality of master pistons may be provided on the master cylinder. In this example, the master cylinder corresponds to the "first cylinder device". The entire force generated by the second hydraulic pressure is supplied to the wheel cylinders 73, 74 of the rear wheels via the actuator 5. Therefore, when the actuator 5 is not driven, the second hydraulic pressure may be supplied entirely to the wheel cylinders 73, 74 of the rear wheels. In this mode as well, the brake control device 1, 10 may apply different hydraulic pressures to the front wheels and the rear wheels. Note that the brake control device 1, 10 may be provided with the regenerative braking mechanism Y. The regenerative braking mechanism Y may be provided on one or both of the front wheel side and the rear wheel side. A flow passage for supplying the second hydraulic pressure may be connected to the master cylinder, and a flow passage for supplying the first hydraulic pressure may be connected to the actuator 5.

When the brake control device 1, 10 does not include the first separation cylinder 16 and the second separation cylinder 17, a set load of the biasing members provided respectively on the front wheel side wheel cylinders and the rear wheel side wheel cylinders may be adjusted. In this case, for example, the set load of the biasing members provided on the wheel cylinders adapted to receive the first hydraulic pressure may be set to be larger than the set load of the biasing members provided on the wheel cylinders adapted to receive the second hydraulic pressure. In this case as well, the same advantageous effects as in the mode including the first separation cylinder 16 and the second separation cylinder 17 are achieved.

The invention claimed is:

1. A brake control device configured to adjust a front wheel braking hydraulic pressure of a front wheel cylinder provided on a front wheel of a vehicle and a rear wheel braking hydraulic pressure of a rear wheel cylinder provided on a rear wheel of the vehicle, the brake control device comprising:
a hydraulic pressure generating unit configured to adjust a hydraulic pressure generated by an electric motor to be an adjusted hydraulic pressure, and apply the adjusted hydraulic pressure as the rear wheel braking hydraulic pressure; and
a hydraulic pressure correcting unit configured to adjust to decrease the adjusted hydraulic pressure to be a corrected hydraulic pressure, and apply the corrected hydraulic pressure as the front wheel braking hydraulic pressure.

2. The brake control device according to claim 1, further comprising a first cylinder device including a first cylinder portion and a first piston portion slidable in the first cylinder portion,
wherein the hydraulic pressure generating unit applies the adjusted hydraulic pressure to the first cylinder device, and
the first cylinder device outputs the rear wheel braking hydraulic pressure according to a sliding movement of the first piston portion caused by the adjusted hydraulic pressure.

3. The brake control device according to claim 2, further comprising a second cylinder device including a second cylinder portion and a second piston portion slidable in the second cylinder portion,
wherein the hydraulic pressure correcting unit applies the corrected hydraulic pressure to the second cylinder device,
the second cylinder device outputs the front wheel braking hydraulic pressure according to a sliding movement of the second piston portion caused by the corrected hydraulic pressure, and
a force required for the first piston portion to slide in the first cylinder portion is larger than a force required for the second piston portion to slide in the second cylinder portion.

4. The brake control device according to claim 3,
wherein the first cylinder device includes a first elastic member configured to bias the first piston portion in a predetermined direction in the first cylinder portion,
the second cylinder device includes a second elastic member configured to bias the second piston portion in a predetermined direction in the second cylinder member, and
a set load of the first elastic member is larger than a set load of the second elastic member.

5. The brake control device according to claim 1,
wherein the hydraulic pressure generating unit includes a pump provided in a return flow passage and driven by the electric motor, and
a differential pressure control valve provided in the return flow passage and configured to adjust the adjusted hydraulic pressure.

* * * * *